United States Patent [19]
Vogt et al.

[11] Patent Number: 4,950,522
[45] Date of Patent: Aug. 21, 1990

[54] PLASTIC CONSTRUCTION MEMBER FOR A MOTOR VEHICLE

[75] Inventors: Hans Vogt, Overath; Oskar Hurten, Koln; Erwin Spiegel, Bergheim, all of Fed. Rep. of Germany

[73] Assignee: Ford Motor Company, Dearborn, Mich.

[21] Appl. No.: 944,639

[22] Filed: Dec. 19, 1986

[30] Foreign Application Priority Data

Dec. 24, 1985 [DE] Fed. Rep. of Germany ....... 3546050

[51] Int. Cl.⁵ ............................................... B32B 3/12
[52] U.S. Cl. ...................................... 428/73; 296/191; 428/116; 428/198; 428/319.1
[58] Field of Search ................. 428/73, 116, 117, 118, 428/120, 198, 319.1; 296/191; 156/292

[56] References Cited

U.S. PATENT DOCUMENTS

| | | | |
|---|---|---|---|
| 2,102,233 | 12/1937 | Biederman | 428/72 |
| 2,196,615 | 4/1940 | Surprenant | 428/198 X |
| 2,719,809 | 10/1955 | Herts | 428/73 X |
| 2,839,442 | 7/1958 | Whitaker | 428/316.6 X |
| 3,018,205 | 1/1962 | Barut | 428/116 |
| 3,042,562 | 7/1962 | Peterson | 428/98 X |
| 3,271,224 | 9/1966 | Bjernekull | 428/116 X |
| 3,407,110 | 10/1968 | Axelson et al. | 428/117 |
| 3,639,106 | 2/1972 | Yate | 428/116 X |
| 3,642,550 | 2/1972 | Doll | 428/116 X |
| 3,709,161 | 1/1973 | Kauffman | 428/116 X |
| 3,769,145 | 10/1973 | Gresham et al. | 428/118 |
| 3,902,732 | 9/1975 | Fosha, Jr. et al. | 428/116 X |
| 3,910,374 | 10/1975 | Holehouse | 428/116 X |
| 3,948,346 | 4/1976 | Schindler | 428/116 X |
| 4,020,207 | 4/1977 | Alfter et al. | 428/116 X |
| 4,421,811 | 12/1983 | Rose et al. | 428/116 |
| 4,539,245 | 9/1985 | Sarin et al. | 428/116 |
| 4,643,933 | 2/1987 | Picken | 428/119 X |
| 4,836,084 | 6/1989 | Vogelesang et al. | 428/911 X |

FOREIGN PATENT DOCUMENTS

| | | | |
|---|---|---|---|
| 598425 | 5/1960 | Canada | 428/119 |
| 2238676 | 2/1974 | Fed. Rep. of Germany | 428/31 |
| 2548398 | 5/1977 | Fed. Rep. of Germany | 428/43 |
| 1049528 | 11/1966 | United Kingdom | 428/116 |

Primary Examiner—Henry F. Epstein
Attorney, Agent, or Firm—Peter D. McDermott; Roger L. May

[57] ABSTRACT

The invention relates to a plastic construction member, in particular an impact-absorbing external body panel, such as an engine hood or mudguard for a motor vehicle. The body panel is formed of a sandwich construction having inner and outer skins bonded to a soft core of, for example, hard foam, a honeycomb structure or paper webs. The connection between the surface of the skins and that of the core is selectively interrupted. In this way, crumple zones are formed in selected regions of the body panel.

11 Claims, 2 Drawing Sheets

PLASTIC CONSTRUCTION MEMBER FOR A MOTOR VEHICLE

BACKGROUND OF THE INVENTION

1. Field of the Invention

The invention relates to a plastic construction member, in particular a motor vehicle body panel having built in weaknesses to form a crumple zone.

2. Discussion of the Related Art

An impact absorbing body panel for a motor vehicle, which is constructed in the form of a pressed sheet metal part and which is provided on its inside with defined points of weakness at which impact forces act first, is known from DE-OS 22 38 676.

A further vehicle body panel of plastic construction is known from DE-OS 25 48 398. In this case, the plastic construction member is formed as a homogeneous plastic die-cast or injection-molded part and on its inner surface it comprises defined cross-sectional constrictions on which forces of impact act first, so as to result in a preferred mode of destruction of the plastic construction member. A plastic construction member of this type has the disadvantage that, on grounds of styling, such defined points of weakness should be formed in practice only on the inside, i.e., remote from the visible surface. The constriction on the underside of the plastic typically will cause a visible undulation or other imperfection in the outer surface. In addition, during adjustment procedures tool changes are required and the plastic construction member cannot be appreciably effective in an impact-absorbing manner, i.e. in such a way as to absorb energy and reduce the impact forces.

SUMMARY OF THE INVENTION

The present invention seeks to provide a plastic construction member, in particular an impact absorbing external body panel for a motor vehicle, which is formed as a sandwich construction member, as known per se, with relatively rigid inner and outer skins bonded to the opposite sides of a soft core, for example paper webs, a honeycomb structure or hard foam material, and is provided with defined points of weakness, such that impact forces cause deformation and crumpling first at the points of weakness and are dissipated and reduced thereby.

According to the present invention, there is provided a plastic construction member for use as a motor vehicle body panel, which member is of sandwich construction having relatively rigid inner and outer skins bonded to the opposite sides of a soft core, wherein at selected surface portions the connection of the skins to one another through the soft core is locally interrupted to provide regions of weakness and which crumpling can occur preferentially upon impact. The soft core may conveniently be formed of paper webs, a honeycomb structure or a plastic foam.

In one embodiment of the invention, one of the skins is not bonded to the soft core at the selected surface portions. This may advantageously be achieved by preventing the bonding of one of the skins to the soft core by interposing a foil having a separation coating between the core and the skin.

In an alternative embodiment, at the selected surface portions, the soft core is formed with a recessed surface or cut in a plane generally parallel to the adjacent surface of the rigid skin.

In the proposed construction of the member, surface portions not strengthened by the sandwich constructions may be formed at either the inner or outer skin, thereby reducing the maximum compressive stress that can be withstood upon impact and creating a crumple zone wherever desired without marring the appearance of the outside surface of the body panel. Energy is absorbed upon impact in that the outer skins are peeled off the soft core by the impact forces, the impact energy being dissipated in the peeling of the skins from the soft core and in the bending and destruction of the skins.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
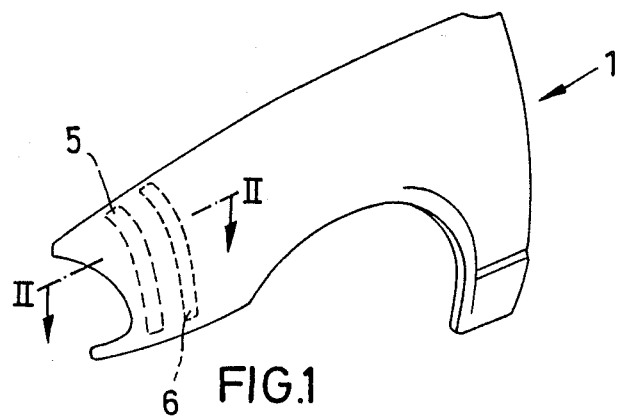
FIG. 1 is an oblique view of a front mudguard of a motor vehicle, having sandwich construction according to the invention.
Figure 2:
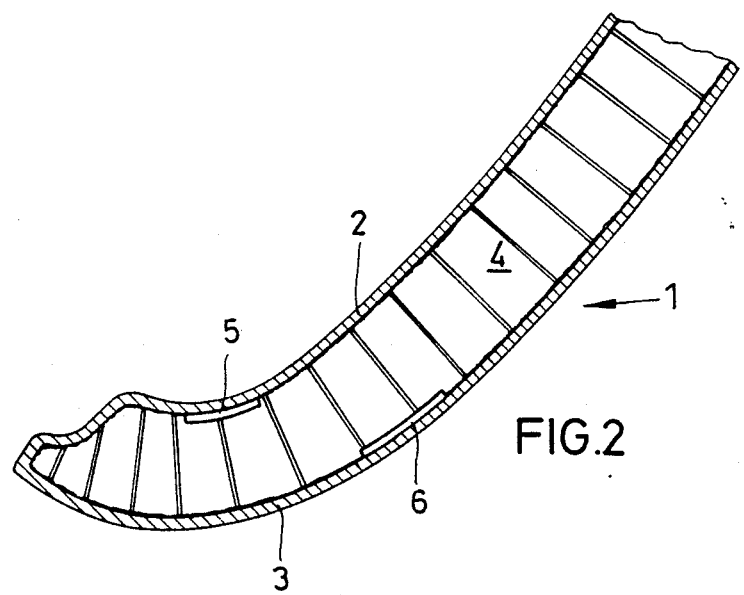
FIG. 2 is a section along the line II—II in FIG. 1, showing detached surface portions.

The front mudguard 1 of a motor vehicle shown in FIG. 1 and 2 is constructed as a sandwich construction member. The front mudguard 1 thus comprises a thick and rigid inner skin 2 and a similar outer skin 3, which are joined together by way of a soft core layer 4 of paper webs, honeycomb structures or hard foam material.

At specific defined positions on the front mudguard 1 detached surface portions 5 and 6 are provided between the inner skin 2 and the core layer 4 and between the outer skin 3 and the core layer 4, respectively. At surface portions 5 and 6 the connection between the inner and outer skins 2 and 3 and the core layer 4 is interrupted. The separation between the skins 2 and 3 and the core layer 4 can be effected in an advantageously simple manner by a local separating foil insert in the form of aluminium, plastic foil, for example polyethylene foil, or layers of other separating means. The desired points of weakness can be produced by pressing appropriate separating means onto the prepared core layer, by the so-called pre-press method.

Figure 3:
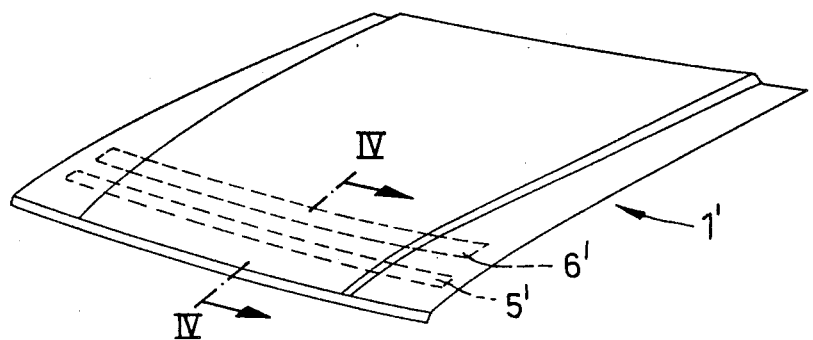
FIG. 3 is an oblique view of an engine compartment hood for a motor vehicle, which hood is in the form of a sandwich construction member according to the invention.
Figure 4:
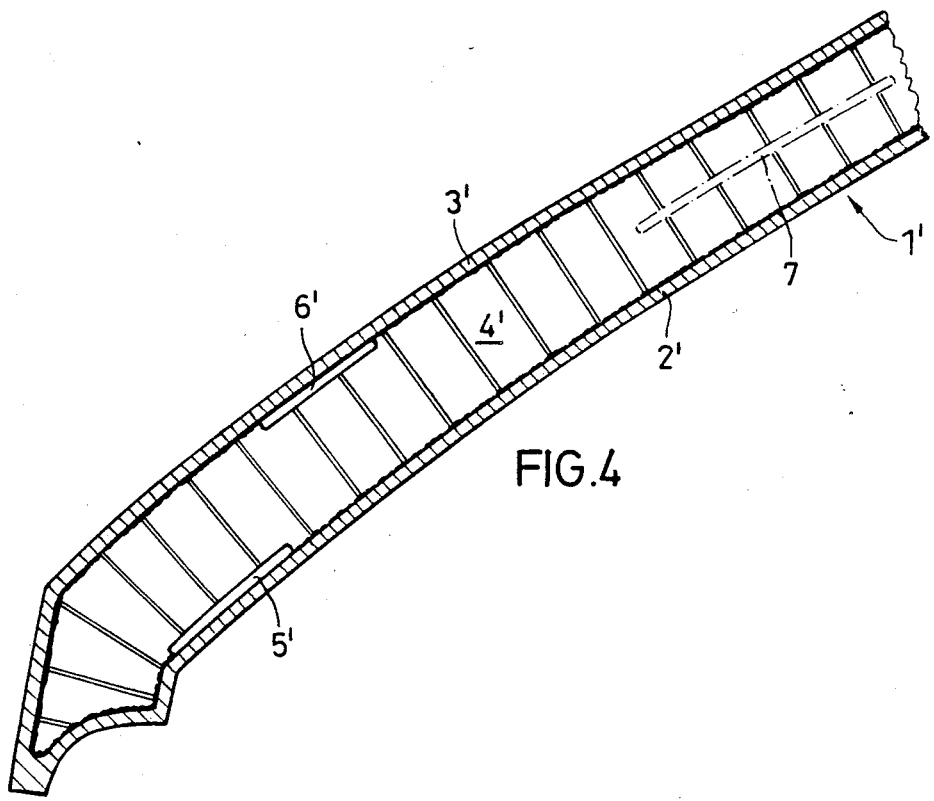
FIG. 4 is a section along the line IV—IV in FIG. 3, showing detached surface portions.

With respect to the engine compartment hood 1' illustrated in FIGS. 3 and 4, the construction is generally similar to that of the above-discussed mudguard, and for this reason the individual parts have been given corresponding reference numerals. The mode of operation is accordingly the same as was explained in connection with the mudguard of FIGS. 1 and 2. In the central area of the hood 1' the dashed lines indicate a detached surface portion 7 inside the core layer 4', which is formed for example by two core layer portions which are superposed one above the other. Such core layers are not joined at surface portion 7 and, according to the embodiment shown in FIG. 4 there is a locally recessed or cut portion of the core layer at surface portion 7. In the event of an impact, folding on one side is not initiated first but, rather, a bellows-shaped spreading of the sandwich construction member is initiated, in which the non-detached surfaces of the core layer adjacent the detached partial surface portion 7 start to tear apart and thereby dissipate the forces of impact.

In view of the present disclosure, it will be understood that the layout and configuration of the detached surface portions 5, 6, and 5', 6' and 7 can be determined by calculation or experimentally by those skilled in the art. In particular, it is within the ability of those skilled in the art, in view of the present disclosure, to arrange detached surface portions in such a way that in these surface regions the sandwich construction member receives a local stability which is less than that of surrounding areas of the body panel. In this way a local corrugation can be produced on the sandwich construction member in the event of impact. The result is dissipation of the impact forces.

We claim:

1. A motor vehicle body panel of sandwich construction, comprising a relatively rigid skin bonded to a surface of a core member and means defining crumple zones in limited selected areas for absorbing energy and dissipating impact forces, the connection of the skin to the core being selectively interrupted.

2. The motor vehicle body panel of claim 1 further comprising a second relatively rigid skin, wherein said relatively rigid skin and said second relatively rigid skin are bonded to opposite surfaces of said core member.

3. The motor vehicle body panel of claim 2, wherein the connection of said second relatively rigid skin to said core member is selectively interrupted.

4. The motor vehicle body panel of claim 1, wherein said core member is formed of paper webs.

5. The motor vehicle body panel of claim 1, wherein said core member has a honeycomb structure.

6. The motor vehicle body panel of claim 1, wherein said core member comprises plastic foam.

7. The motor vehicle body panel of claim 1, wherein the connection of said relatively rigid skin to said core member is selectively interrupted by means of a foil interposed between said relatively rigid skin member and said core member.

8. The motor vehicle body panel of claim 1, wherein the connection of said relatively rigid skin to said core member is selectively interrupted by means of recessed surface portions of said core member.

9. A motor vehicle body panel of sandwich construction, comprising a relatively rigid skin bonded to a surface of a core member and means defining nonuniformly spaced crumple zones in limited selected areas for absorbing energy and dissipating impact forces, the connection of the skin to the core being interrupted in said areas.

10. A motor vehicle body panel of sandwich construction, comprising a relatively rigid skin bonded to a surface of a core member, wherein said core member includes at least one portion which has detached partial surface portions that are superimposed upon one another and said detached partial surface portions are separated by a locally recessed portion of said core layer which extends along the length of said body panel defining crumple zones.

11. A motor vehicle body panel of sandwich construction, comprising a relatively rigid skin selectively bonded to the outer surfaces of a core member, said core member substantially filling said skin and contact between said core member and said skin being substantially continuous and having selected recesses which extend less than the thickness between opposite dies of said core defining crumple zones.

* * * * *